United States Patent
Vranish

(10) Patent No.: US 7,255,483 B1
(45) Date of Patent: Aug. 14, 2007

(54) THRUST ROLLERS

(75) Inventor: John M. Vranish, Crofton, MD (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 267 days.

(21) Appl. No.: 10/093,621

(22) Filed: Jun. 18, 2002

Related U.S. Application Data

(60) Provisional application No. 60/273,313, filed on Mar. 3, 2001.

(51) Int. Cl.
F16C 19/50 (2006.01)

(52) U.S. Cl. ........................ 384/551; 384/565
(58) Field of Classification Search ................ 384/552, 384/555, 553, 551, 494, 561, 563–565
See application file for complete search history.

(56) References Cited

U.S. PATENT DOCUMENTS

| 892,866 | A | * | 7/1908 | Moonen | 384/561 |
| 1,220,345 | A | * | 3/1917 | Koster | 384/571 |
| 1,285,125 | A | * | 11/1918 | Golden | 384/561 |
| 1,410,988 | A | * | 3/1922 | Birgh | 384/563 |
| 3,312,511 | A | * | 4/1967 | Synek | 384/563 |
| 3,829,183 | A | * | 8/1974 | Hingley | 384/565 |
| 4,027,930 | A | * | 6/1977 | Bodensieck | 384/556 |
| 4,318,574 | A | * | 3/1982 | Nakamura | 384/564 |
| 4,906,110 | A | * | 3/1990 | Van Wyk et al. | 384/463 |
| 5,211,483 | A | * | 5/1993 | Blaurock | 384/56 |
| 5,501,532 | A | * | 3/1996 | Terrill | 384/572 |
| 5,836,701 | A | * | 11/1998 | Vranish | 384/565 |
| 6,071,032 | A | * | 6/2000 | Link | 403/158 |

FOREIGN PATENT DOCUMENTS

GB 2 084 666 A * 9/1981
JP 5-149329 * 6/1993

* cited by examiner

Primary Examiner—Thomas R. Hannon
(74) Attorney, Agent, or Firm—Keith L. Dixon

(57) ABSTRACT

A thrust roller bearing system comprising an inner rotating member, an outer rotating member and multiple rollers coupling the inner rotating member with outer rotating member. The inner and outer rotating members include thrust lips to enable the rollers to act as thrust rollers. The rollers contact inner and outer rotating members at bearing contact points along a contact line. Consequently, the radial/tilt and thrust forces move synchronously and simultaneously to create a bearing action with no slipping.

6 Claims, 12 Drawing Sheets

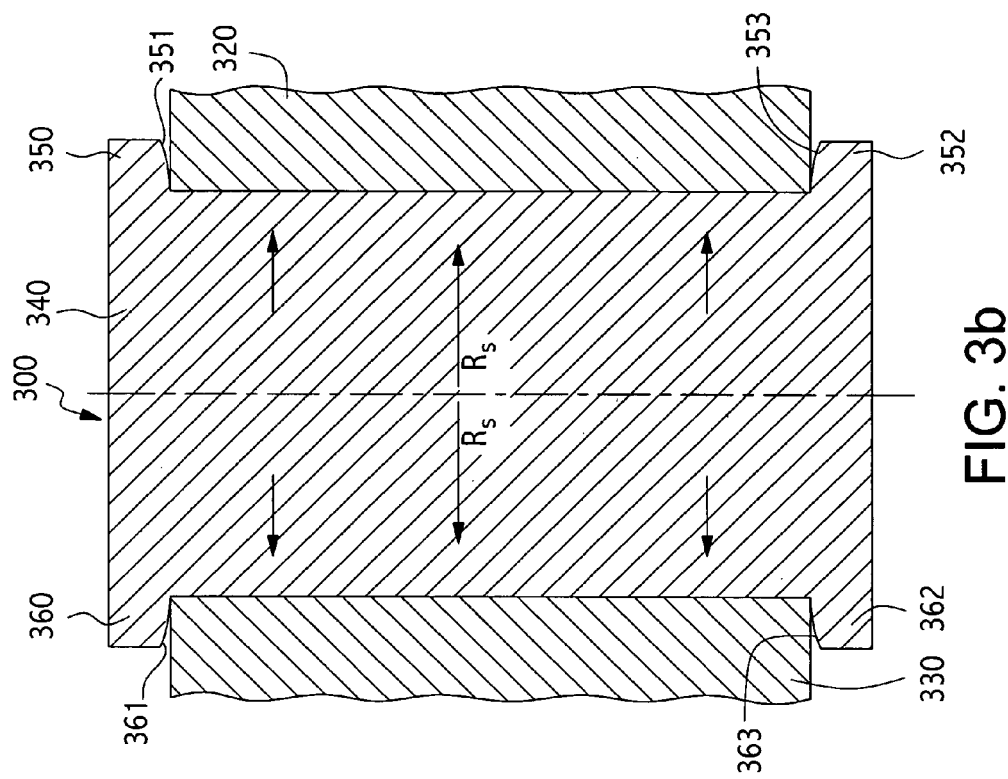
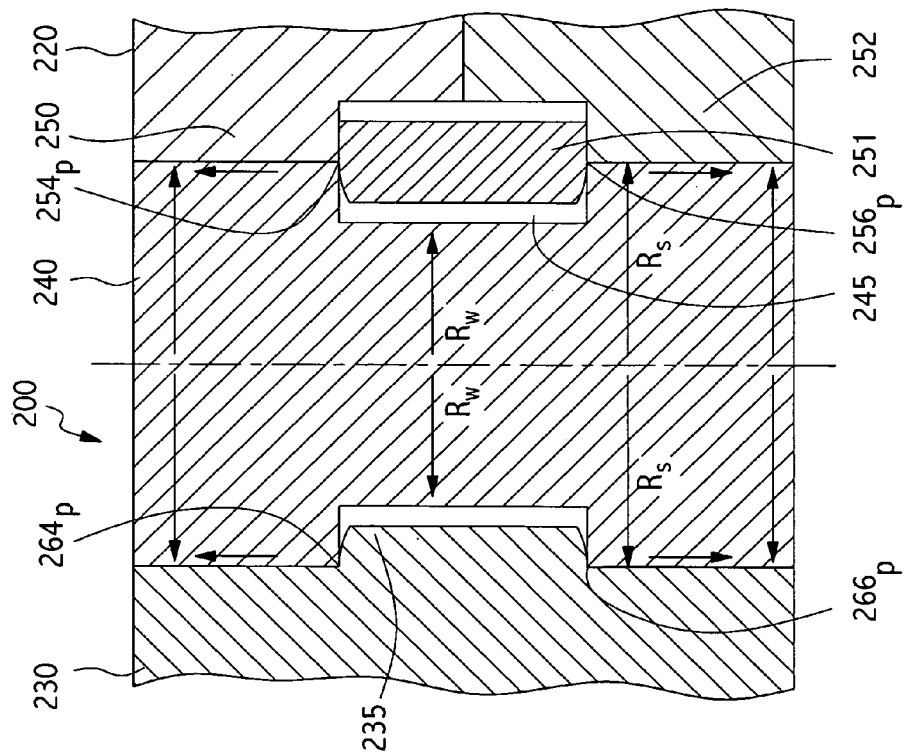

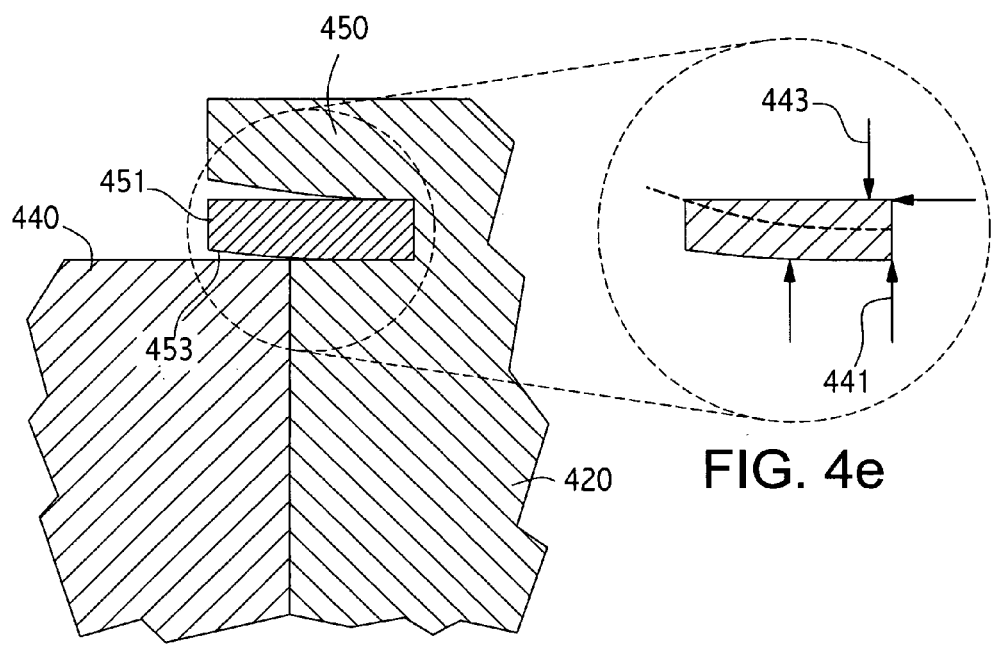
FIG. 4c
FIG. 4e
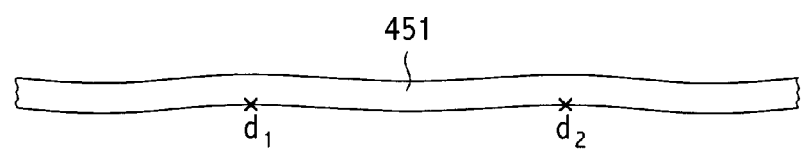
FIG. 4d

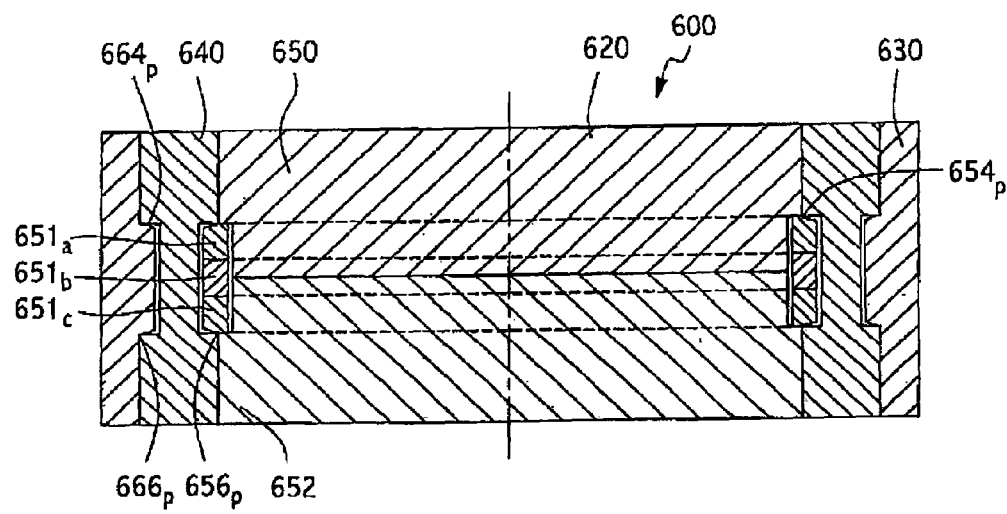
FIG. 6a
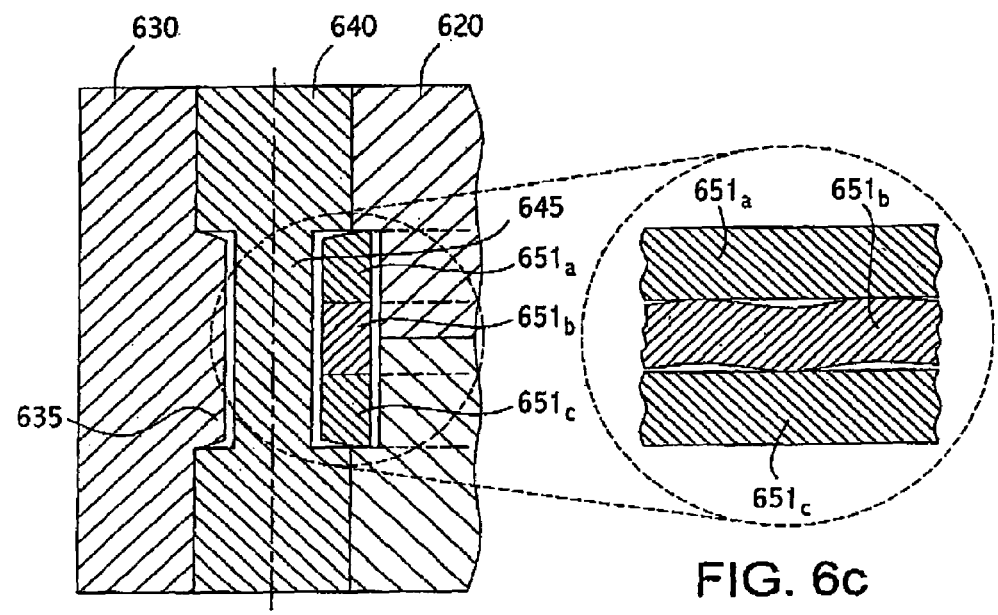
FIG. 6b
FIG. 6c

THRUST ROLLERS

CROSS-REFERENCE TO RELATED APPLICATION

Priority is claimed under 35 U.S.C. § 119(e) from U.S. Provisional Patent Application No. 60/273,313 filed on Mar. 3, 2001.

ORIGIN OF THE INVENTION

The invention described herein was made by an employee of the United States Government, and may be manufactured and used by or for the Government for government purposes without the payment of any royalty thereon or therefore.

TECHNICAL FIELD

This invention relates generally to roller bearings and more particularly to a thrust roller system wherein the roller bearings may be in contact under load in both thrust and radial/tilt simultaneously and synchronously.

BACKGROUND OF THE INVENTION

Roller bearings for providing relative rotary and linear motion between two mutually opposing are well known. Such devices include roller bearings, 4-way bearings, tapered roller bearings, cross roller bearings etc. The load carrying characteristics of these devices are well known and present certain limitations. By way of example, the tapered bearings are more difficult to preload but are superior in their axial load bearing capabilities than thrust rollers. 4-way ball bearings have less load bearing capabilities than thrust rollers. Cross roller bearings are comparable in axial load carrying capabilities but are inferior in radial and tilt loads to the thrust roller. Thus, there always exist a need for improvement in these devices and in particular in the load bearing capabilities of these devices.

The present invention significantly improves the bearing system performance without a significant increase in cost. The present invention can provide a thrust capability as well as a tilt and radial force capability. The thrust capability of the present invention is much stronger than ball bearings, competitive with crossed roller bearings and simpler and cheaper than tapered bearings. The advantages of the present invention create an attractive alternative to the traditional bearing systems. traditional load bearing systems can even be retrofitted to include the features and advantages of the present invention.

SUMMARY OF THE INVENTION

Accordingly, it is an object of the present invention to provide an improvement in thrust roller bearing systems.

It is another object of the invention to provide a thrust roller bearing system that has axial and tilt load capabilities.

It is a further object of this invention to provide a thrust roller bearing system that provides significant thrust load bearing capabilities.

It is yet a further object of the present invention to provide a thrust roller bearing system that provides radial/tilt load bearing capabilities while eliminating the height of the thrust lips.

It is still a further object of the present invention to provide a thrust roller bearing system wherein the axial and radial/tilt forces act simultaneously.

It is yet another object of the present invention to provide a thrust roller bearing system wherein the axial and radial/tilt forces act synchronously to create bearing action.

It is yet a further object of the present invention to provide a thrust roller bearing system that includes compliant washers.

It is still another object of the present invention to provide a thrust roller bearing system that includes leveraged bushing race lips.

The foregoing and other objects of the present invention are achieved by providing a thrust roller bearing system comprising an inner rotating member, an outer rotating member and multiple rollers coupling the inner rotating member with outer rotating member. The inner rotating member includes thrust lips to enable the rollers to act as thrust rollers. The outer member includes thrust lips which also enable the rollers to act as thrust rollers. The rollers contact inner and outer rotating members at bearing contact points along a contact line. This arrangement allows the inner rotating member and the outer rotating member to operate in rolling friction under simultaneous radial, thrust and tilt loads. This is made possible by curving the thrust lips away from the rollers. Thus the radial/tilt and thrust forces move synchronously and simultaneously to create a bearing action with no slipping.

BRIEF DESCRIPTION OF DRAWINGS

The following detailed description of the invention will be more readily understood when considered together with the accompanying drawings wherein:

FIG. 3a shows a side section view of the thin waist version of the thrust roller bearing system of the present invention.

FIG. 3b shows a side section view of the dumbbell version of the thrust roller bearing system of the present invention.

FIG. 4c shows the washer detail of the compliant version of the thrust roller bearing system of the present invention.

FIG. 4d shows the local deformations of the compliant version of the thrust roller bearing system of the present invention.

FIG. 4e shows the washer detail with thrust and reaction forces of the compliant version of the thrust roller bearing system of the present invention.

FIG. 6a shows a side section view of the thin waist compliant version of the thrust roller bearing system of the present invention.

FIG. 6b shows a detailed side section view of the thin waist compliant version of the thrust roller bearing system of the present invention.

FIG. 6c shows a detailed side section view of the deformation of the thrust washers.

DETAILED DESCRIPTION OF THE INVENTION

To those skilled in the art, many modifications and variations of the present invention are possible in light of the teachings contained herein. It is therefore to be understood that the present invention can be practiced otherwise than as specifically describe by these teachings and still be within the spirit and scope of the claims.

Figure 1A:
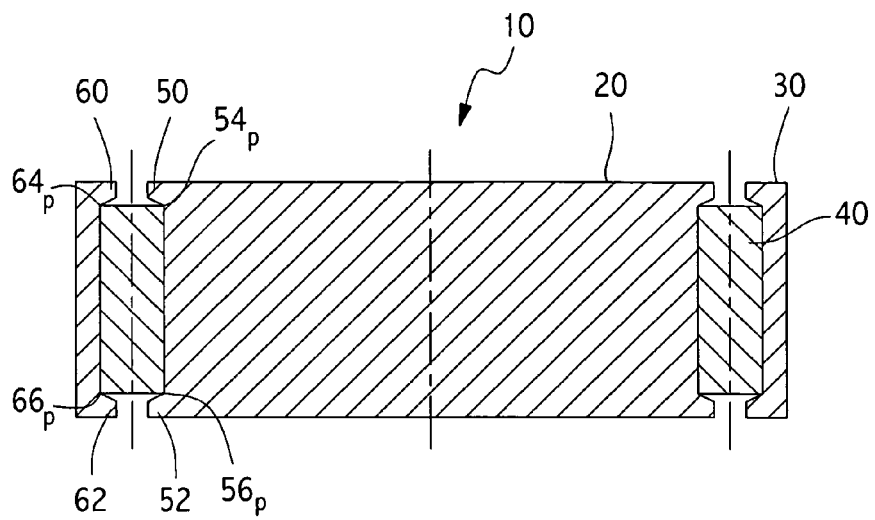
FIG. 1a shows a side section view the thrust roller bearing system of the present invention.

Referring now to the drawings and more particularly to FIG. 1(a) which shows the thrust roller bearing system 10 of the present invention as a side section view comprising an inner rotating member 20, an outer rotating member 30, multiple rollers 40 coupling the inner rotating member 20 with outer rotating member 30. Inner rotating member 20 includes thrust lips 50 and 52 to facilitate rollers 40 to act as thrust rollers. Outer member 30 includes thrust lips 60 and 62 which also facilitate rollers 40 to act as thrust rollers. Rollers 40 contact inner rotating member 20 at contact line 54 and contact line 56 (not shown). Rollers 40 contact outer rotating member 30 at contact points 64p and 66p.

Figure 1B:
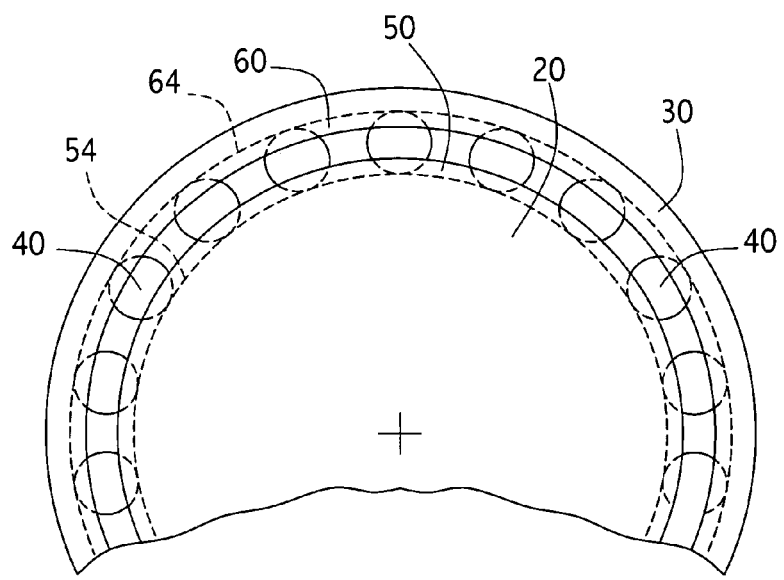
FIG. 1b shows a top view the thrust roller bearing system of the present invention.

FIG. 1(b) is a top view of FIG. 1 (a). Roller bearing system 10 also includes a carrier (not shown) to keep rollers 40 equally spaced and to keep their frictional losses at a minimum. FIG. 1(b) includes the multiple rollers 40 and contact lines 54 and 64 which are hidden lines in the view. Thrust roller bearing system 10 operates like a typical roller bearing system with the added capability of being able to resist axial (thrust) loads by using thrust lips 50, 52, 60 and 62 to define the contact with the rollers in thrust in such a manner as to provide thrust constraints that is speed-synchronized with the radial rolling constraint. This arrangement allows inner rotating member 20 and outer rotating member 30 to operate in rolling friction under simultaneous radial, thrust, tilt loads. This is made possible by curving thrust lips 50, 52, 60 and 62 away from rollers 40.

Figure 1C:
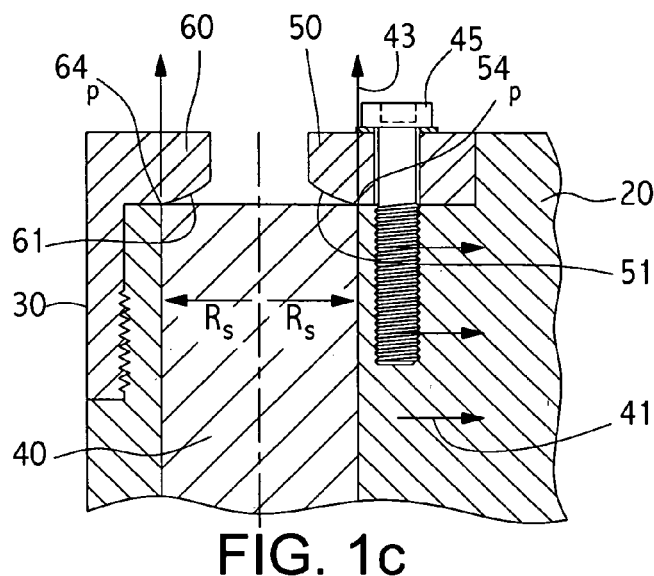
FIG. 1c shows a detailed side section view the thrust roller bearing system of the present invention.

FIG. 1(c) shows a detailed section of the rollers 40 in contact with thrust lips 50 and 60. Thrust lips 50 includes a curved portion 51 and thrust lip 60 includes a curved portion 61. Thrust lips 52 and 62 also include curved portions (not shown). Curved portions 51 and 61 along with the curved portions (not shown) of thrust lips 52 and 62 ensure that rollers 40 contact inner rotating member 20 and outer rotating member 30 at the same distance Rs from the center of rotation of rollers 40 for both thrust and radial/tilt loads. When this condition is met, rollers 40 may be in contact under load in both axial and radial/tilt loads simultaneously. Further, in this arrangement the load forces of thrust and radial/tilt move together and do not slide with respect to each other. Thus radial loads 41 along the circumference of rollers 40 are the tilt forces and axial loads 43 at the top and bottom of rollers 40 are the same distance Rs from the center of rotation of rollers 40 and are the thrust and tilt forces. Consequently, the radial/tilt and thrust forces move synchronously and simultaneously to create a bearing action with no slipping. Bolt member 45 is used to retrofit thrust lip 50 to inner rotating member 20. Thrust lip 50 and inner rotating member 20 may also be fashioned as one unit thus eliminating the need for bolt member 45.

Figure 1D:
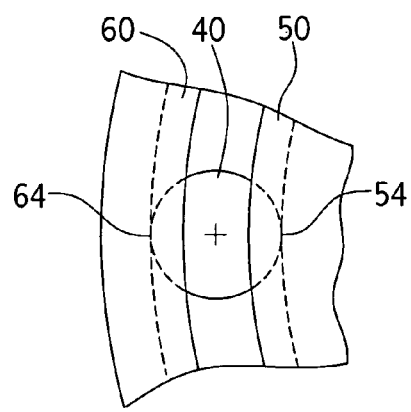
FIG. 1d shows a detailed top view the thrust roller bearing system of the present invention

FIG. 1(d) shows a top view of FIG. 1(c).

Figure 1E:
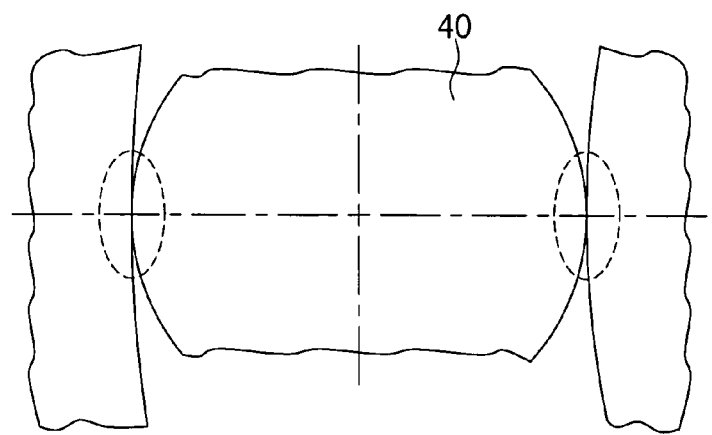
FIG. 1e is a close-up view of FIG. 1d showing the areas of contact.

FIG. 1(e) is a detailed view of FIG. 1(d) showing the bearing compression regions of roller 40.

Figure 2A:
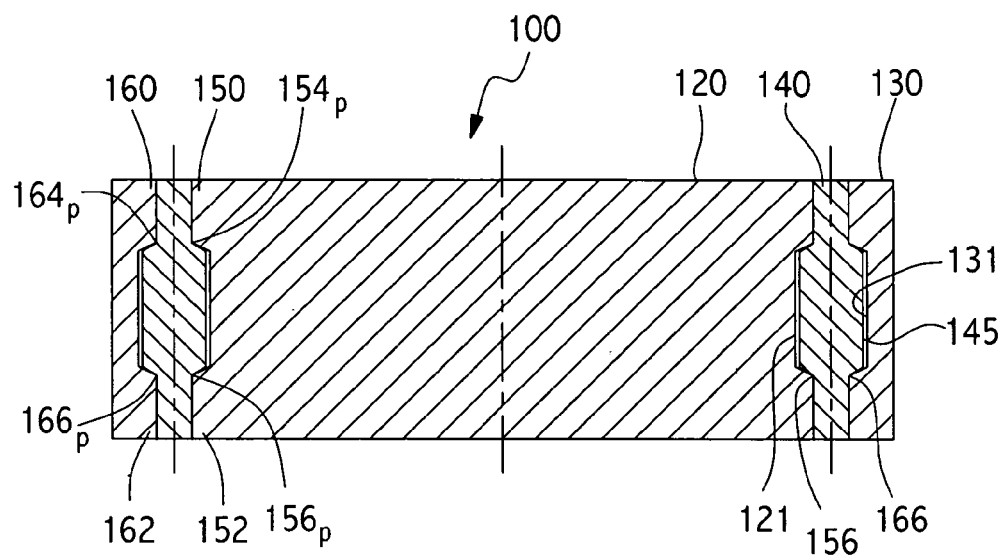
FIG. 2a shows a side section view of the thick waist version of the thrust roller bearing system of the present invention.

FIG. 2(a) shows an alternate embodiment 100 of the thrust roller bearing system 10 of the present invention as a side section view. Thrust roller bearing system 100 is a thick waist version of thrust roller bearing system 10 where the interference in thrust is caused by a thick waist protruding into a groove 121 in the inner rotating member 120 and a groove 131 in the outer rotating member 130. Roller bearing system 100 includes inner rotating member 120, an outer rotating member 130, multiple rollers 140 coupling the inner rotating member 120 with outer rotating member 130. Rollers 140 include a thick waist portion 145. Inner rotating member 120 includes thrust lips 150 and 152 which contact thick waist portion 145 of rollers 140 to enable rollers 140 to act as thrust rollers. Outer member 130 includes thrust lips 160 and 162 which contact thick waist portion 145 of roller 140 to enable rollers 140 to act as thrust rollers. Thick waist portion 145 of rollers 140 contact inner rotating member 120 at contact lines 154 and 156. Thick waist portion 145 of rollers 140 contact outer rotating member 130 at contact lines 164 and 166.

Figure 2B:
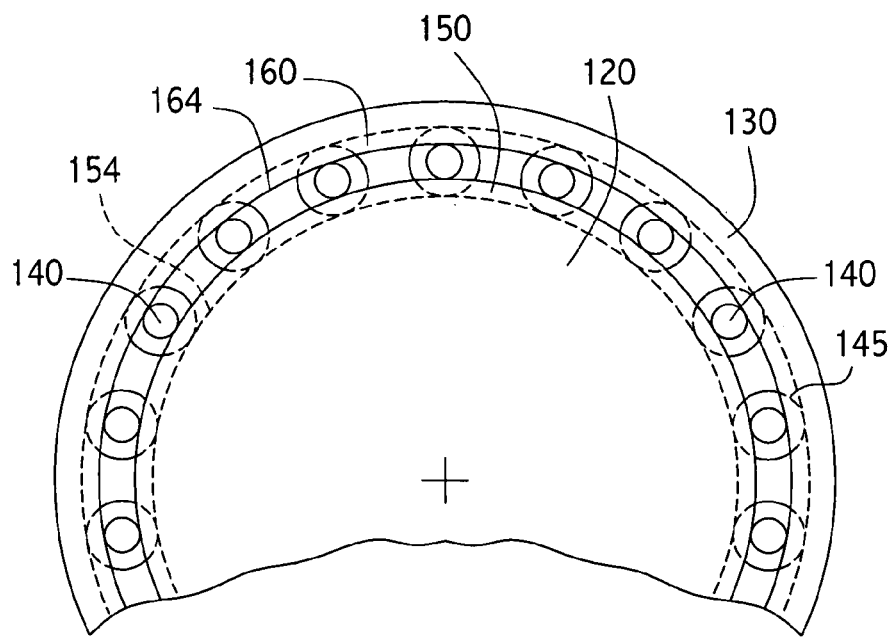
FIG. 2b shows top view of the thick waist version of the thrust roller bearing system of the present invention.

FIG. 2(b) includes the multiple rollers 140 and contact lines 154 and 164 which are hidden lines in the view. Thrust lips 150 include a curved portion 151 and thrust lip 160 includes a curved portion 161. Thrust lips 152 and 162 also include curved portions 153 and 163 respectively. As a matter of design choice, one may decide not to include the curved portions of thrust lips 150, 152, 160 and 162.

Figure 2C:
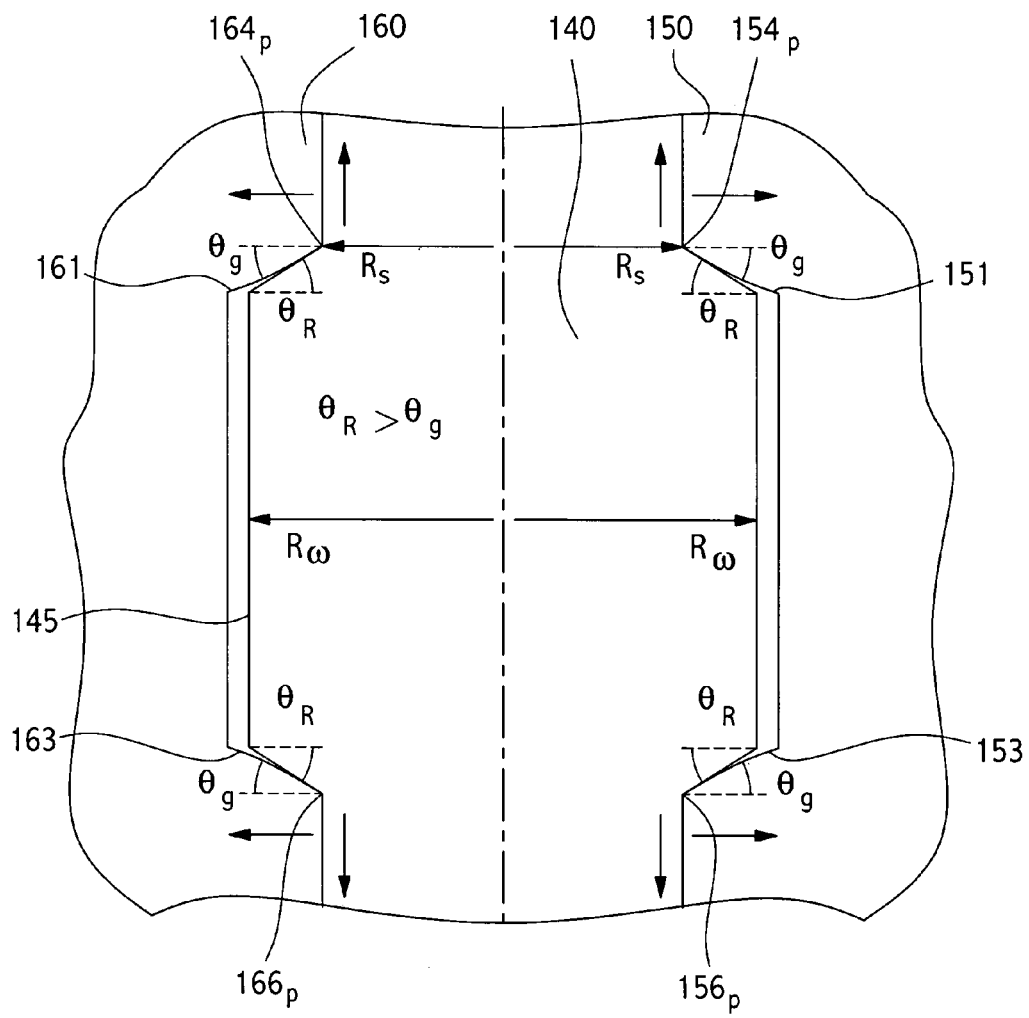
FIG. 2c shows a detailed side section view of the thick waist version of the thrust roller bearing system of the present invention.

In FIG. 2(c) the angle θr of thick waist portion 145 is slightly larger than the groove angle θg for both inner rotating member 120 and outer rotating member 130. It is this slight difference in thick waist portion and the groove angle θg that ensures that rollers 140 contact inner rotating member 120 and outer rotating member 130 at the same distance Rs from the center of rotation of rollers 140 for both thrust and radial/tilt loads. This arrangement also defines thrust contact points 154p, 156p, 164p and 166p along contact lines 154, 156, 164 and 166 respectively. The thrust point of contact is a set distance Rs from the center of rotation of thick waist portion 145 of roller 140. This defines a thrust point contact set at Rs from the center of thick waist portion 145.

FIG. 3(a) shows an alternate embodiment 200 of the thrust roller bearing system 10 of the present invention as a side section view. Thrust roller bearing system 200 is a thin waist version of thrust roller bearing system 10 where the interference in thrust is caused by a thrust washer 251 protruding into a groove 245 in roller 240. Thrust roller bearing system 200 operates essentially like thrust roller bearing system 100 except that the groove 245 is in bearing 240 as opposed to inner rotating member 220. Thrust Roller bearing system 200 includes inner rotating member 220, an outer rotating member 230, multiple rollers 240 coupling the inner rotating member 220 with outer rotating member 230. Rollers 240 include a thin waist portion 245. Inner rotating member 220 includes thrust lips 250 and 252 which contact thrust washer 251 which in turn engages thin waist portion 245 of rollers 240 to enable rollers 240 to act as thrust rollers. Outer member 230 includes protruding portion 235 which contact thin waist portion 245 of roller 240 to enable rollers 240 to act as thrust rollers. Thin waist portion 245 of rollers 240 contact inner rotating member 220 at contact points 254*p* and 256*p*. Thin waist portion 245 of rollers 240 contact outer rotating member 230 at contact points 244*p* and 266*p*.

FIG. 3(*b*) shows an alternate embodiment 300 of the thrust roller bearing system 10 of the present invention as a side section view. Thrust roller bearing system 300 is a dumbbell version of thrust roller bearing system 10 where the interference in thrust is caused by protruding thrust lips 350, 352, 360 and 362 of roller 340. Thrust lips 350 includes a curved portion 351 and thrust lip 360 includes a curved portion 361. Thrust lips 352 and 362 also include curved portions 353 and 363 respectively. Curved portions 351 and 361 along with the curved portions 353 and 363 of thrust lips 352 and 362 ensure that rollers 340 contact inner rotating member 320 and outer rotating member 330 at the same distance Rs from the center of rotation of rollers 340 for both thrust and radial/tilt loads.

Figure 4A:
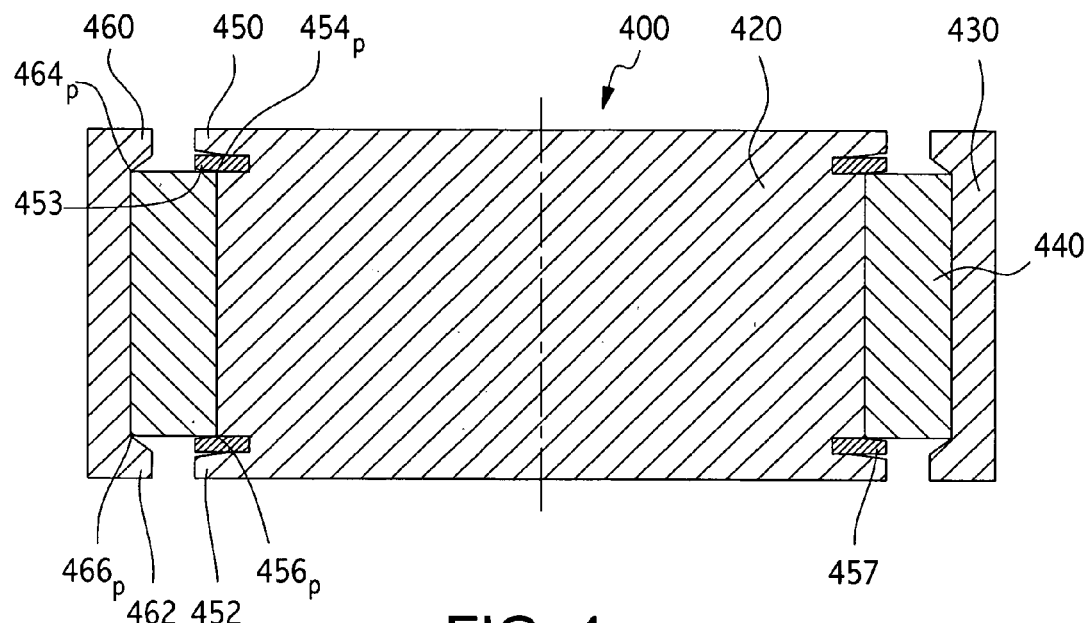
FIG. 4a shows a side section view of the compliant version of the thrust roller bearing system of the present invention.
Figure 4B:
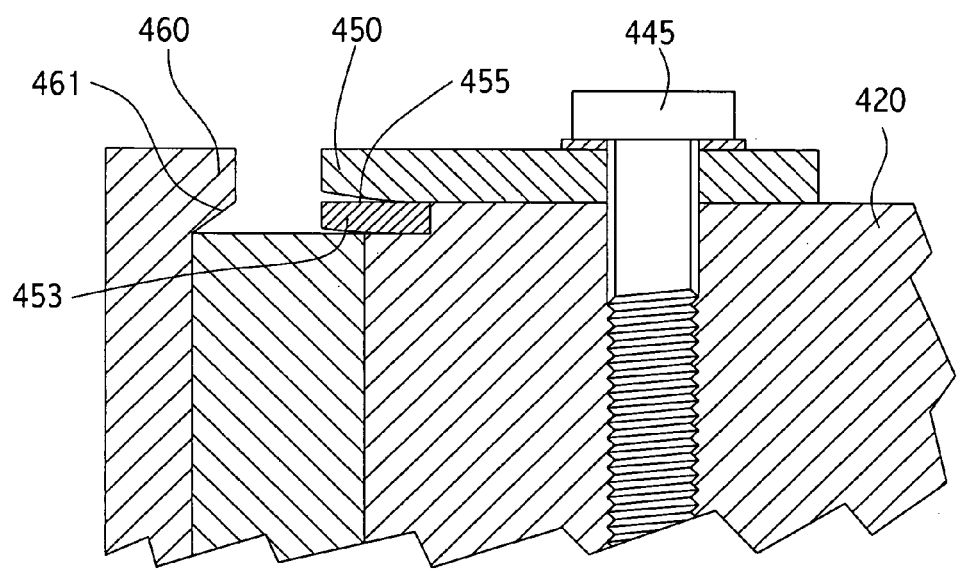
FIG. 4b shows a detailed view of the compliant version of the thrust roller bearing system of the present invention.

FIG. 4(*a*) shows an alternate embodiment 400 of the thrust roller bearing system 10 of the present invention as a side section view comprising an inner rotating member 420, an outer rotating member 430, multiple rollers 440 coupling the inner rotating member 420 with outer rotating member 430. Inner rotating member 420 includes thrust lips 450 and 452 to facilitates rollers 440 to act as thrust rollers. Inner rotating member 420 further includes a pair of compliant washers 455 and 457 which are located at the top and bottom portions respectively of inner rotating member 420. This arrangement allows the thrust loads to be distributed between rollers 440 and thereby significantly increase the thrust load capability of thrust roller bearing system 400. Outer member 430 includes thrust lips 460 and 462 which also facilitate rollers 440 to act as thrust rollers. Rollers 440 contact inner rotating member 420 at contact points 454*p* and 456*p*. Rollers 440 contact outer rotating member 430 at contact points 464*p* and 466*p*.

FIG. 4(*b*) shows a detailed section of the rollers 440 in contact with compliant washer 455 which in turn contact thrust lip 450. Thrust lip 450 includes curved portion 451 and thrust lip 460 includes curved portion 461. Thrust lips 452 and 462 also include curved portions (not shown). Compliant washers 455 and 457 include curved portion 453. Curved portion 453 of compliant washer 455 contact rollers 440 to enable rollers 440 to act as thrust rollers.

FIG. 4(*c*) shows a detail of the curved portion 453 of compliant washer 451 in contact with roller 440.

FIG. (4*d*) illustrates local deformations of compliant washer 451. thus showing how a single washer may provide compliance for several rollers.

FIG. 4(*e*) shows a detailed view of compliant washer 451 with thrust loads 441 and reaction loads 443.

Figure 5A:
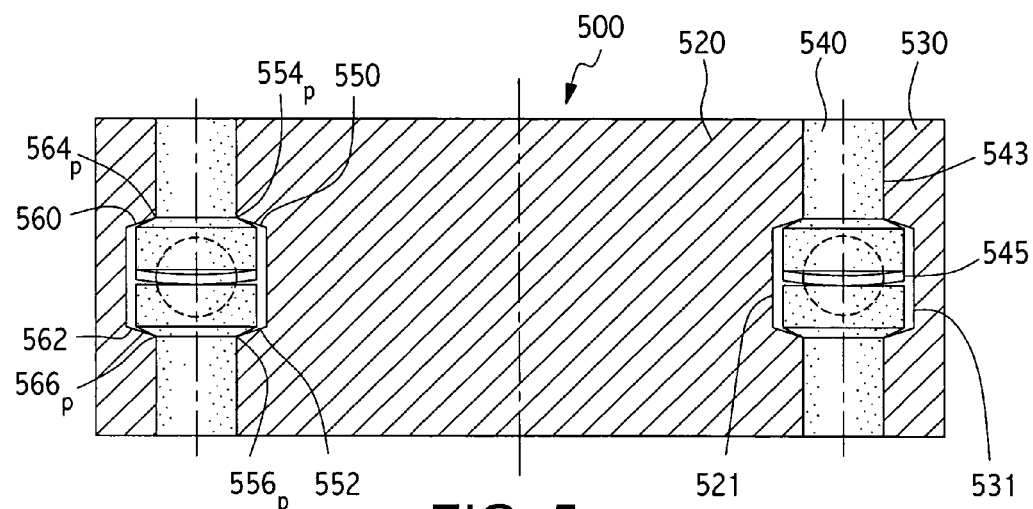
FIG. 5a shows a side section view of the thick waist compliant version thrust roller bearing system of the present invention.
Figure 5B:
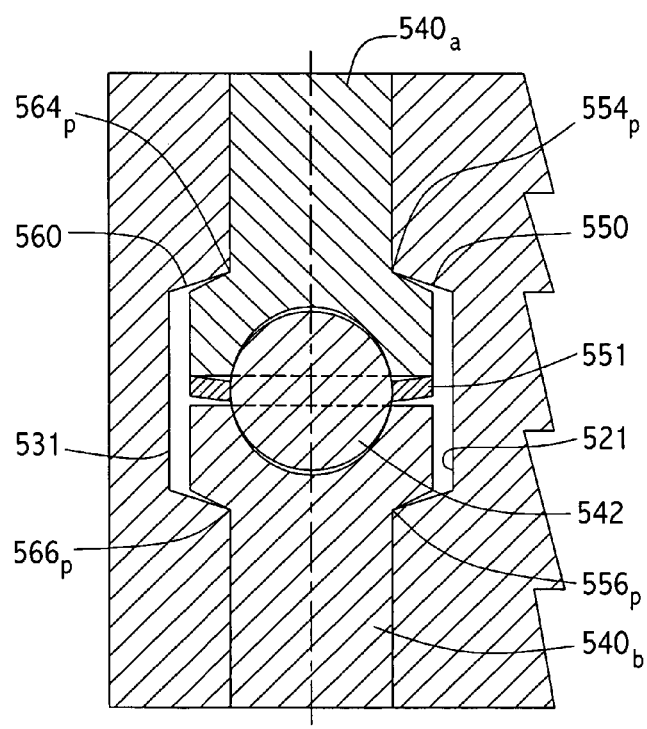
FIG. 5b shows a detailed section of the thick waist compliant version of the thrust roller bearing system of the present invention.

FIG. 5(*a*) shows an alternate embodiment 500 of the thrust roller bearing system 10 of the present invention as a side section view. Thrust roller bearing system 500 is a thick waist compliant version of thrust roller bearing system 10 where the interference in thrust is caused by a thick waist 545 protruding into a groove 521 in the inner rotating member 520 and a groove 531 in the outer rotating member 530. Roller 540 is split in half. Thick waist portion 545 includes a curved donut shaped (torus) compliant washer 551 and ball bearing 542 between each of the two halves 540*a* and 540*b*. Roller bearing system 500 includes inner rotating member 520, an outer rotating member 530, multiple rollers 540 coupling the inner rotating member 520 with outer rotating member 530. Rollers 540 include a thick waist portion 545. Inner rotating member 520 includes thrust lips 550 and 552 which contact thick waist portion 545 of rollers 540 to enable rollers 540 to act as thrust rollers. Outer member 530 includes thrust lips 560 and 562 which contact thick waist portion 545 of roller 540 to enable rollers 540 to act as thrust rollers. Thick waist portion 545 of rollers 540 contact inner rotating member 520 at contact points 554*p* and 556*p*. Thick waist portion 545 of rollers 540 contact outer rotating member 530 at contact points 564*p* and 566*p*. The compliant washer increases the thrust capability of thrust roller system 500 and ball bearing 542 keeps compliant washer properly located.

FIG. 5(*b*) shows a detailed section of the thick waist compliant version of the thrust roller bearing system shown in FIG. 5(*a*)

FIG. 6(*a*) shows an alternate embodiment 600 of the thrust roller bearing system 10 of the present invention as a side section view. Thrust roller bearing system 600 is a thin waist version of thrust roller bearing system 10 where the interference in thrust is caused by a series of thrust washers 651*a*, 651*b* and 651*c* protruding into a groove 645 in roller 640. Thrust roller bearing system 600 operates essentially like thrust roller bearing system 200 except that the single thrust washer 251 of thrust roller bearing system 200 is replaced with a series of thrust washers 651*a*, 651*b* and 651*c*. Groove 645 is made long enough to accommodate a series of thrust washers which together facilitate both assembly and compliance. Thrust washers 651*a* and 651*c* are constructed to function like thrust washer 251 of thrust roller bearing system 200. Thrust washer 651*b* is a compliance washer which provides proper axial compliance and increase the thrust load bearing capability of thrust bearing system 600. Thrust Roller bearing system 600 also includes inner rotating member 620, an outer rotating member 630, multiple rollers 640 coupling the inner rotating member 620 with outer rotating member 630. Rollers 640 include a thin waist portion 645. Inner rotating member 620 includes thrust lips 650 and 652 which contact thrust washers 651*a* and 651*c* which in turn engage thin waist portion 645 of rollers 640 to enable rollers 640 to act as thrust rollers. Outer member 630 includes protruding portion 635 which contact thin waist portion 645 of roller 640 to enable rollers 640 to act as thrust rollers. Thin waist portion 645 of rollers 640 contact inner rotating member 620 at contact points 654*p* and 656*p*. Thin waist portion 645 of rollers 640 contact outer rotating member 630 at contact points 664*p* and 666*p*.

FIG. 6(*b*) is a detailed view of roller 640 and thrust washers 651*a*, 651*b* and 651*c*.

FIG. 6(*c*) shows a detailed side section view of the deformation of the thrust washers.

Figure 7A:
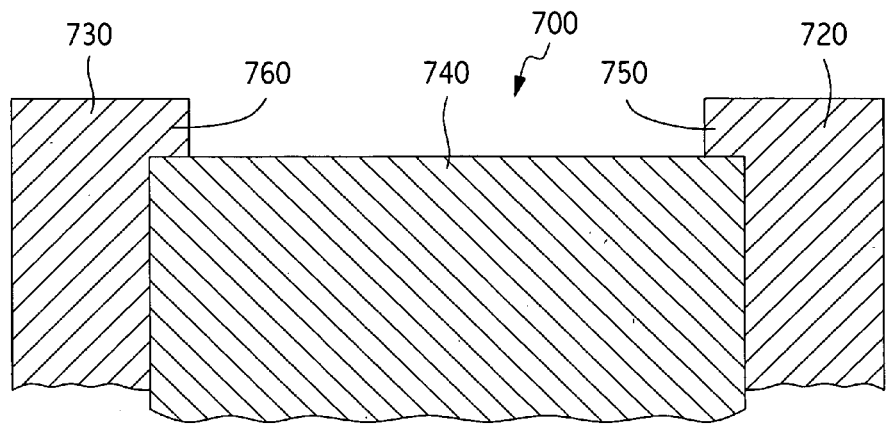
FIG. 7a shows a side section view of the anti-friction leveraged thrust bushing version of the present invention.
Figure 7B:
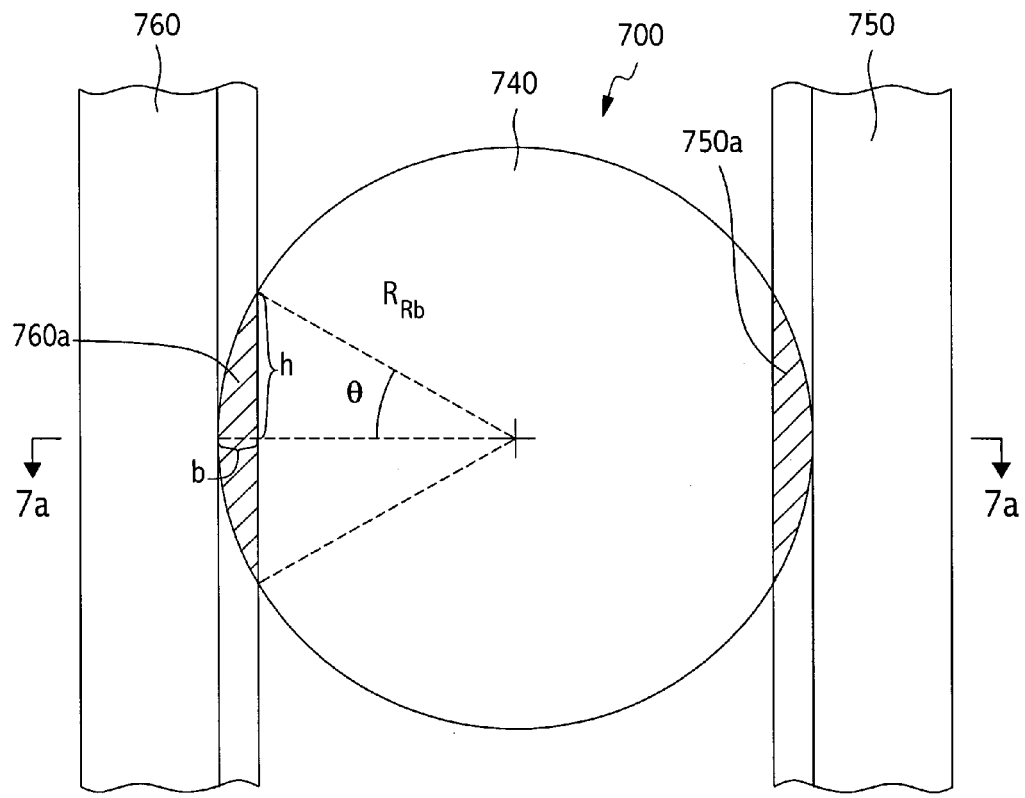
FIG. 7b shows a top view of the anti-friction leveraged thrust bushing version of the present invention.

FIG. 7(*a*) and FIG. 7(*b*) show an alternate embodiment 700 of the thrust roller bearing system 10 of the present invention as a side section view. Thrust roller bearing system 700 is an anti-friction leveraged thrust bushing version of thrust roller bearing system 10. Unlike the curved portion 51 and 61 of thrust lips 50 and 60 respectively of thrust bearing system 10, the thrust lips 750 and 760 are not curved. This arrangement provides for a small area contact between roller 740 and thrust lips 750 and 760. Thus, this arrangement increases the thrust capability of thrust bearing system 700 because it includes a small area contacts 750a and 760a as opposed to point contacts. It should be noted that the small area contacts shown (750a and 760a) are exaggerated in order to aid the discussion. As demonstrated in FIG. 7(b), the small contact area is essentially triangular in shape. In this particular arrangement, the contact stress will be constant across the triangular area. It should be noted that FIG. 7(a) shows a roller 740 working between two slides 720 and 730. This is the linear actuator configuration. This embodiment could also be fashioned in a rotary configuration.

Figure 7C:
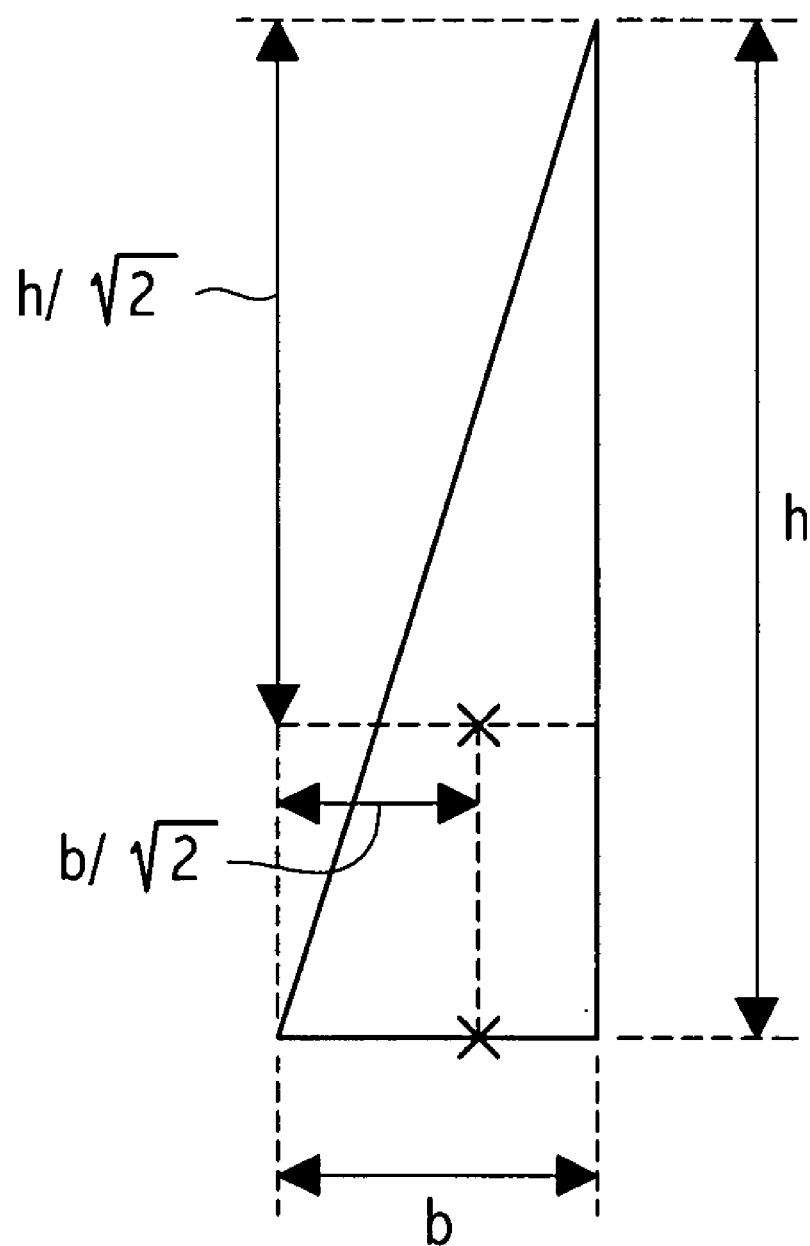
FIG. 7c shows contact area approximation of the anti-friction leveraged thrust bushing version of the present invention.

FIG. 7(c) shows the contact area approximation between roller 740 and slides 720 and 730.

Figure 8A:
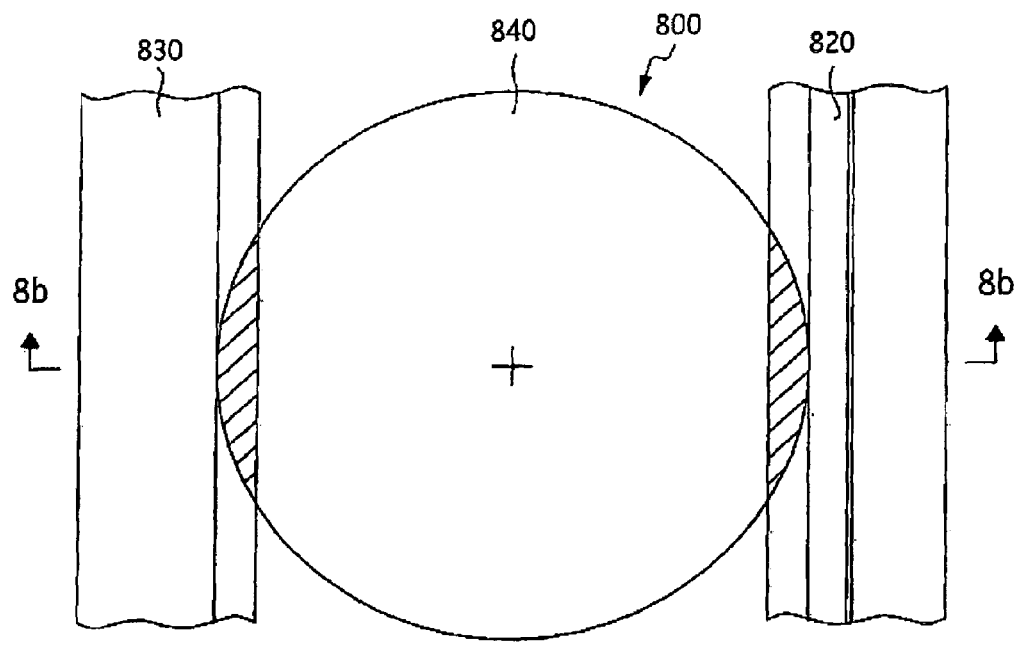
FIG. 8a shows a top view of the compliant leveraged thrust bushing version of the present invention.
Figure 8B:
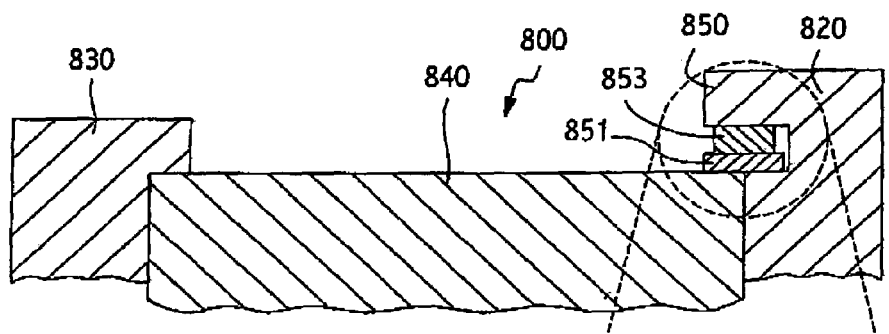
FIG. 8b shows a side section view of the compliant leveraged thrust bushing version of the present invention.
Figure 8C:
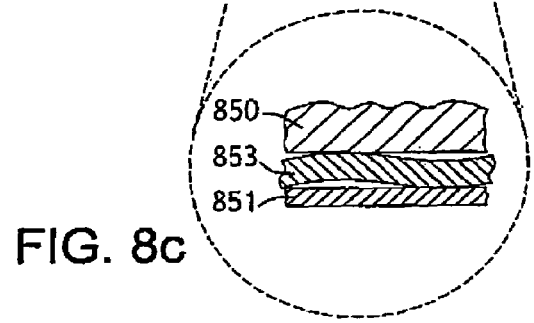
FIG. 8c shows a close-up view of the areas of contact of the compliant washer shown in FIG. 8b.

FIGS. 8(a) and (b) show an alternate embodiment 800 of the thrust roller bearing system 10 of the present invention. Thrust roller bearing system 800 is a compliant leveraged thrust bushing version of thrust roller bearing system 10. Thrust roller bearing system 800 is operates from the same concept as show for thrust roller bearing system 400 (compliant thrust roller) as both systems require a compliant washer. However in thrust roller bearing system 800 a two layer compliant washer system is required rather than a single thrust washer because of the leveraged bushing configuration. In thrust roller system 400 the curved portion 453 of compliant washer 451 can bend and roll so as to accommodate multiple thrust rollers. In the present embodiment the thrust lips can not bend and roll because the thrust lip does not allow it. Rather, thrust lip 850 must yield in a direct axial direction without rolling. Thus a second compliant washer is needed to provide direct axial compliance. Thrust roller bearing system 800 provides a thin ring washer 851 that allows for continuous bushing contact with thrust roller 840. Axial compliant washer 853 provides the local axial compliance for thin ring washer 851. Thin ring washer 851 and axial compliant washer 853 both have individual axial compliance along with a smooth, continuous thrust bushing contact. This is the linear actuator configuration. This embodiment could also be fashioned in a rotary configuration.

FIG. 8(a) shows the contact area approximation between roller 840 and slides 820 and 830.

To those skilled in the art, many modifications and variations of the present invention are possible in light of the teachings contained herein. It is therefore to be understood that the present invention can be practiced otherwise than as specifically describe by these teachings and still be within the spirit and scope of the claims.

I claim:

1. A roller bearing system comprising:
   an inner rotating member;
   an outer rotating member;
   multiple rollers with a thick waist portion coupling said inner rotating member with said outer rotating member wherein said multiple rollers include a compliant washer means in said thick waist portion;
   a first pair of thrust lips on said inner rotating member so as to provide a thrust load bearing capability of said roller bearing system wherein said first pair of thrust lips includes a curvilinear portion that facilitates point contacts with said multiple rollers, and;
   a second pair of thrust lips on said outer rotating member with a curvilinear portion that facilitates point contacts with said multiple rollers wherein points of contact on said inner and outer rotating members are the same distance from the center of rotation of each roller.

2. The roller bearing system of claim 1 wherein an axial load acts synchronously with a radial load.

3. The roller bearing system of claim 2 wherein said axial load and said radial load move synchronously and simultaneously.

4. A roller bearing system comprising:
   an inner rotating member;
   an outer rotating member;
   multiple rollers with a thin waist portion coupling said inner rotating member with said outer rotating member wherein said thin waist portion includes a compliant washer means;
   a first pair of thrust lips on said inner rotating member so as to provide a thrust load bearing capability of said roller bearing system wherein said first pair of thrust lips includes a curvilinear portion that facilitates point contacts with said multiple rollers, and;
   a second pair of thrust lips on said outer rotating member with a curvilinear portion that facilitates point contacts with said multiple rollers wherein points of contact on said inner and outer rotating members are the same distance from the center of rotation of each roller.

5. A roller bearing system comprising
   an inner rotating member;
   an outer rotating member;
   multiple rollers with a thick waist portion coupling said inner rotating member with said outer rotating member wherein said multiple rollers include a compliant washer means in said thick waist portion;
   a first pair of thrust lips on said inner rotating member so as to provide a thrust load bearing capability of said roller bearing system; and
   a second pair of thrust lips on said outer rotating member wherein said first and second pairs of thrust lips each include a curvilinear portion to facilitate a synchronous and simultaneous movement of an axial load and a radial load.

6. A roller bearing system comprising
   an inner rotating member;
   an outer rotating member;
   multiple rollers with a thin waist portion coupling said inner rotating member with said outer rotating member wherein said thin waist portion includes a compliant washer means;
   a first pair of thrust lips on said inner rotated member so as to provide a thrust load bearing capability of said roller bearing system; and
   a second pair of thrust lips on said outer rotating member wherein said first and second pairs of thrust lips each include a curvilinear portion to facilitate a synchronous and simultaneous movement of an axial load and a radial load.

* * * * *